United States Patent
Duffy et al.

(10) Patent No.: US 9,131,715 B2
(45) Date of Patent: Sep. 15, 2015

(54) GRAIN-BASED HOT CEREAL COMPOSITIONS HAVING REDUCED FOAMING

(71) Applicant: MOM Brands Company, Minneapolis, MN (US)

(72) Inventors: David Klaus Duffy, Maple Grove, MN (US); Molly Elizabeth McGurk Moen, Rosemount, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 13/791,169

(22) Filed: Mar. 8, 2013

(65) Prior Publication Data

US 2014/0037796 A1 Feb. 6, 2014

Related U.S. Application Data

(60) Provisional application No. 61/679,467, filed on Aug. 3, 2012.

(51) Int. Cl.
*A23L 1/168* (2006.01)
(52) U.S. Cl.
CPC .......... *A23L 1/1685* (2013.01); *A23V 2002/00* (2013.01)
(58) Field of Classification Search
CPC .......... A23L 1/1685; A23V 2200/204; A23V 2250/1886
USPC ........ 426/619, 72, 73, 74, 660, 654, 464, 108
See application file for complete search history.

(56) References Cited

U.S. PATENT DOCUMENTS

| | | | |
|---|---|---|---|
| 2,632,705 A | 3/1953 | Scharf | |
| 3,096,179 A | 7/1963 | Finucane et al. | |
| 3,160,507 A | 12/1964 | Finucane | |
| 3,783,165 A | 1/1974 | Cascione | |
| 3,919,111 A | 11/1975 | Heyden et al. | |
| 3,961,087 A * | 6/1976 | Zukerman | 426/262 |
| 4,588,596 A | 5/1986 | Bone et al. | |
| 4,670,270 A * | 6/1987 | Germino et al. | 426/89 |
| 4,978,543 A | 12/1990 | Finnerty et al. | |
| 5,034,241 A | 7/1991 | Keyser et al. | |
| 5,035,913 A | 7/1991 | Sky | |
| 5,069,917 A | 12/1991 | Keyser et al. | |
| 5,360,626 A | 11/1994 | Iyengar et al. | |
| 5,820,905 A | 10/1998 | Osaka et al. | |
| 6,057,375 A | 5/2000 | Wollenweber et al. | |
| 6,287,615 B1 | 9/2001 | Runge et al. | |
| 2010/0015293 A1 * | 1/2010 | Shapiro et al. | 426/87 |
| 2010/0291311 A1 | 11/2010 | Trouve et al. | |
| 2011/0111096 A1 * | 5/2011 | Parsons et al. | 426/61 |

OTHER PUBLICATIONS

Van Nostrand's Enclyclopedia of Chemistry, 2005, John Wiley and Sons, Inc. Defoaming Agents, pp. 1-3.*

(Continued)

*Primary Examiner* — Helen F Heggestad
(74) *Attorney, Agent, or Firm* — Merchant & Gould P.C.

(57) ABSTRACT

Grain-based hot cereal compositions having reduced foam capacity are disclosed. The compositions can include wheat farina, oat groats, rolled oats, and steel cut oats. The compositions comprise a stearyl antifoam agent that prevents boil over of the compositions during stove top or microwave cooking without adversely affecting the taste, texture, or appearance of the finished product.

43 Claims, 4 Drawing Sheets

(56) References Cited

OTHER PUBLICATIONS

International Search Report and Written Opinion for PCT/US2013/053506 mailed Nov. 18, 2013.

* cited by examiner

GRAIN-BASED HOT CEREAL COMPOSITIONS HAVING REDUCED FOAMING

This application claims priority to U.S. application Ser. No. 61/679,467 filed Aug. 3, 2012, which is hereby incorporated by reference in its entirety.

BACKGROUND

Grain-based hot cereal products, such as wheat hot cereal, oat meal, and grits, are typically cooked by adding water and/or milk to the product and boiling the mixture. This process, however, has a tendency to create foams during the cooking process that often spill outside of the cooking vessel. Boil over of the cereal product caused by foaming creates a mess for the consumer and can destroy the cereal product being prepared.

To prevent boil over during stove top or microwave cooking of grain-based hot cereals, the consumer is provided with directions to stop and stir the product frequently. This frequent "stop and stir" reduces boiling during product preparation, thereby reducing the amount of foam produced during cooking of the product, but can increase cook times and requires the consumer to closely monitor cooking progress to avoid excess foam formation to prevent boil over.

A solution for boil over associated with cooking of grain-based hot cereals, in particular farina based cereals, has been sought for over half a century. Potential solutions tested over the years include the addition of papain, plant oils, soy lecithin, and mono- and di-glycerides to farina hot cereal products to prevent boil over. However, none of these additives resulted in significant reduction of boil over and many of the additives negatively affected the taste, texture, and/or appearance of the finished product. Therefore, a need exists for grain-based hot cereal compositions exhibiting reduced foaming during the cooking process without adversely affecting the taste, texture, and appearance of the finished product.

SUMMARY

Grain-based hot cereal compositions having reduced foam capacity are disclosed. The compositions can include wheat farina, oat groats, rolled oats, and steel cut oats. The compositions comprise an amount of stearyl antifoam agent that prevents boil over of the compositions during stove top or microwave cooking without adversely affecting the taste, texture, and/or appearance of the finished product. The foam capacity of the compositions is reduced such that the compositions can be cooked without stiffing on the stove stop or without stopping and stiffing in a microwave. The stearyl antifoam agent comprises a compound containing a stearyl group, including stearates, stearic acid and salts thereof, stearyl alcohols, and stearyl esters. Single serving pouches of the compositions are also disclosed.

DETAILED DESCRIPTION

Figure 1:
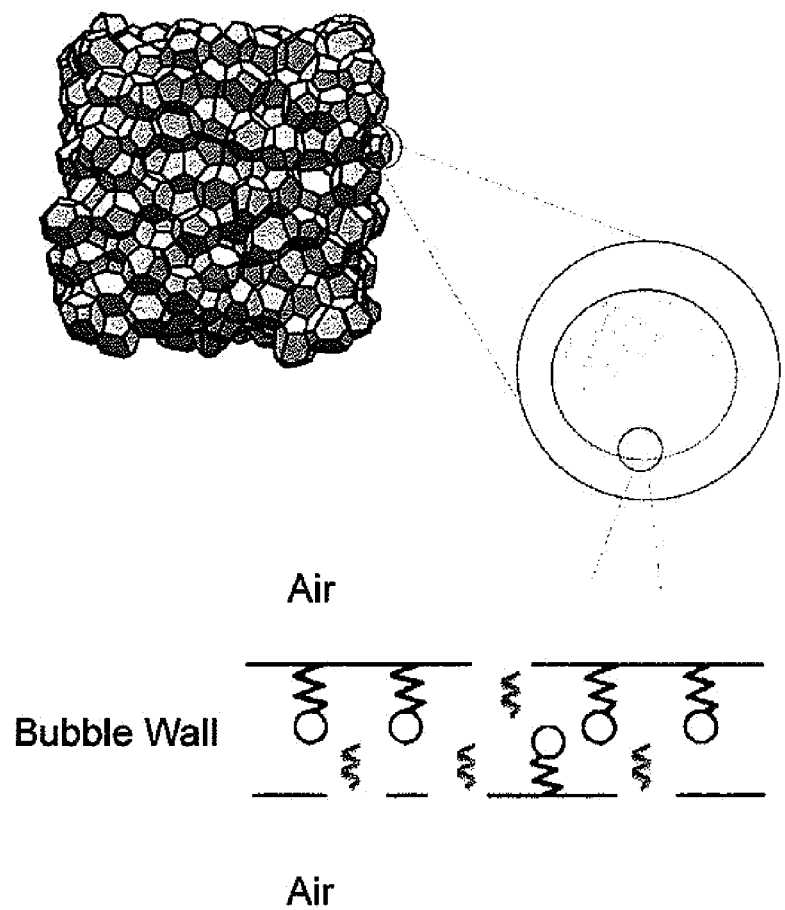
FIG. 1 is a molecular schematic of a bubble wall and shows how an antifoam agent disrupts the bubble wall.

Grain-based hot cereal compositions are generally cooked by adding water, milk, or both to the composition and boiling the mixture to cook/hydrate the composition. The compositions generally include uncooked or partially cooked grains and/or grain particles and can include additional ingredients, such as sweeteners, flavoring agents, colorants, inclusions, thickeners, preservatives, supplemental vitamins and minerals, and fiber additives. Examples of grain-based hot cereal compositions include wheat farina cereal, oat meal, and corn grits. The cooking process for the grain-based hot cereal compositions, however, has a tendency to create foams that often spill outside of the cooking vessel during the cooking of the composition. This "boil over" of the hot cereal composition caused by the foaming creates a mess for the consumer and can destroy the cereal composition being prepared. Wheat farina hot cereals in particular are notorious for foaming when cooked. Examples of wheat farina hot cereals include MALT-O-MEAL™ and CREAM OF WHEAT™.

Types of foams produced by grain-based hot cereal compositions during the cooking process include protein foams and carbohydrate foams, which can be caused by starches and/or non-starch polysaccharides. For foam to be created, a liquid must contain amphiphillic molecules that are capable of forming a bilayer. The amphiphillic molecules, which have a polar end and a non-polar-end, align to form a bilayered bubble wall when brought into close contact and the bilayer begins to stabilize as surface tension increases. Bubbles are formed when the liquid is aerated and gases are introduced into the mixture. In the case of grain-based hot cereal compositions, aeration of the liquid occurs when the composition is heated and the water begins to bowl, creating turbulence in the cooking vessel that produces the foam.

To prevent boil over during cooking of grain-based hot cereal compositions, the consumer generally is provided with directions to stop and stir the product frequently when cooking the hot cereal composition in a microwave or to stir the product frequently when cooking the hot cereal composition on a stove-top. This frequent stirring reduces boiling of the hot cereal compositions, thereby reducing the amount of foam produced during cooking of the compositions, but can increase cook times and requires the consumer to closely monitor cooking progress to avoid excessive foam formation to prevent boil over.

Anti-foam agents have previously been added to grain-based hot cereal compositions to reduce foam formation. Ideally, an anti-foam agent decreases the surface tension of the colloid, diffuses to the bubble wall, and disrupts the amphiphillic bilayer by displacing the amphiphillic molecules. Soy lecithin, for example, has been found to be a suitable anti-foam agent for oat hot cereals, such as oat meal. However, soy lecithin does not sufficiently reduce foam formation in farina hot cereals to prevent boil over during the cooking process. Over the years, addition of the addition of papain, plant oils, soy lecithin, and mono- and di-glycerides to farina hot cereal compositions have been tested to prevent boil over. None of these additives resulted in significant reduction of boil over and many of the additives negatively affected the taste, texture, and appearance of the finished product.

Consumers desire portable single serving pouches of grain-based hot cereal compositions that can be easily cooked in a microwave without constant monitoring to prevent boil over. A single serving pouch of hot grain cereal conveys a message to the consumer that the product is "instant". A hot grain cereal product is generally perceived by consumers as being an "instant" product if it has a cook time less than 5 minutes, preferably 1-3 minutes, and does not require stirring during the microwave cooking process. Boil over of hot grain cereal products, particularly farina hot cereal products, caused by foaming has made it difficult to develop a microwaveable single serving pouch that performs consistent with consumer's perception of an "instant" product. While instant farina hot cereal products have been developed using instantized, partially pre-cooked farina, this ingredient is expensive, difficult to source, and gives an undesirable texture in the finished product.

It has surprisingly been discovered that stearyl compounds are effective anti-foaming agents that reduce foam formation and prevent boil over of grain-based hot cereal compositions, including farina hot grain cereal compositions, during stove top or microwave cooking without adversely affecting the taste, texture, and/or appearance of the finished product. Using these stearyl antifoam agents, grain-based hot cereal compositions that satisfy consumer perceptions and expectations of an "instant" hot cereal product have been developed. As used herein, stearyl antifoam agent refers to compounds containing a stearyl group including stearates, stearic acid and salts thereof, stearyl alcohols, and stearyl esters. Stearates include metallic stearates, including magnesium stearate, sodium stearate, aluminum stearate, calcium stearate, potassium stearate, zinc stearate, and the like. Stearate antifoam agents also include glyceryl monostearate, polyoxyetheylene monostearate, sorbitan monostearate, and polyoxyethylene sorbitan monostearate.

Grain-based hot cereal compositions of the disclosure comprise grain and an amount of a stearyl antifoam agent to reduce foam formation during heating of the composition when mixed with water. Preferably, the grain is a cereal grain. Examples of cereal grains include corn, rice, wheat, rye, barley, oats, buckwheat, and the like. The grain can be whole grain, hulled grain, flaked grain, rolled grain, cut grains, farina, grit, polenta, and mixtures thereof. Examples of grain suitable for use in the compositions of the disclosure include, but are not limited to, wheat farina, oat groats, rolled oats, steel cut oats, and corn grits.

Compositions of the disclosure typically include from about 55% to about 99.5% grain by weight. In an embodiment, the composition comprises from about 55% to about 90% grain by weight. In another embodiment, the composition comprises from about 55% to about 95% grain by weight. In another embodiment, the composition comprises from about 85% to about 99.5% grain by weight. In yet another embodiment, the composition comprises from about 55% to about 85% grain by weight. In some embodiments, the composition comprises farina, flaked grain, rolled grain, or cut grain supplemented with whole grains and/or a multigrain mix of whole grains.

The amount of stearyl antifoam agent can be adjusted dependent on the type and form of grain. Compositions of the disclosure typically include from about 0.05% to about 3.0% by weight of the stearyl antifoam agent. In an embodiment, the composition comprises from about 0.05% to about 2.5% by weight of stearyl antifoam agent. In another embodiment, the composition comprises from about 0.05% to about 2% by weight of stearyl antifoam agent. In an embodiment, the composition comprises from about 0.05% to about 0.7% by weight of stearyl antifoam agent. In another embodiment, the composition comprises from about 0.05% to about 1.5% by weight of stearyl antifoam agent. In an embodiment, the composition comprises from about 0.05% to about 1% by weight of stearyl antifoam agent. In another embodiment, the composition comprises from about 0.05% to about 0.7% by weight of stearyl antifoam agent. In yet another embodiment, the composition comprises from about 0.1% to about 0.5% by weight of stearyl antifoam agent. In yet another embodiment, the composition comprises from about 0.1% to about 0.3% by weight of stearyl antifoam agent.

The amount of stearyl antifoam agent can also be expressed on a per gram basis. Compositions of the disclosure typically include 0.5 micrograms to about 30 micrograms of stearyl antifoam agent per gram of the grain-based hot cereal composition. In an embodiment, the composition comprises from about 0.5 micrograms to about 25 micrograms of stearyl antifoam agent per gram of the composition. In another embodiment, the composition comprises from about 0.5 micrograms to about 20 micrograms of stearyl antifoam agent per gram of the composition. In another embodiment, the composition comprises from about 0.5 micrograms to about 10 micrograms of stearyl antifoam agent per gram of the composition. In another embodiment, the composition comprises from about 0.5 micrograms to about 7 micrograms of stearyl antifoam agent per gram of the composition. In yet another embodiment, the composition comprises from about 1 microgram to about 5 micrograms by stearyl antifoam agent per gram of composition. In yet another embodiment, the composition comprises from about 1 microgram to about 3 micrograms of stearyl antifoam agent per gram of the composition.

In embodiments, the stearyl antifoam agent comprises a powdered or particulate form mixed with the grain. When utilized in particulate form, the particle size of the stearyl antifoam agent can be selected to have a particle size or range of particle sizes similar to the granulation of the grain in the composition. In an embodiment, the particle size of the stearyl antifoam agent is within at least 70% the average particle size of the grain in the composition. In another embodiment, the particle size of the stearyl antifoam agent is within at least 80% the average particle size of the grain in the composition. In yet another embodiment, the particle size of the stearyl antifoam agent is within at least 90% the average particle size of the grain in the composition in the composition. The stearyl antifoam agent can also be heated and sprayed directly onto the grain such that surfaces of the grain are coated with the stearyl antifoam agent.

The compositions of the disclosure can include one or more fiber additives, vitamins, minerals, sweeteners, preservatives, colorants, thickeners, and/or flavoring agents. Examples of fiber additives include oat bran, oat fiber, oat flour, flaxseed, wheat germ, wheat bran, carboxymethylcellulose, and the like. In an embodiment, the compositions of the disclosure include from about 0% to about 30% by weight of fiber additive. In another embodiment, the compositions of the disclosure include from about 10% to about 30% by weight of fiber additive. In another embodiment, the compositions of the disclosure include from about 0.05% to about 10% by weight of fiber additive. In yet another embodiment, the compositions of the disclosure include from about 0.05% to about 5% by weight of fiber additive.

The sweeteners can be natural or artificial sweeteners including brown sugar, honey, sugars including sucrose, dextrose, fructose, and maltose, barley malt, high fructose corn syrup, corn syrup solids, sucralose, aspartame, saccharin, cyclamates, stevia, and the like. In an embodiment, the compositions of the disclosure include from about 0% to about 30% by weight of sweetener. In another embodiment, the compositions of the disclosure include from about 0.05% to about 30% by weight of sweetener. In another embodiment, the compositions of the disclosure include from about 20% to about 30% by weight of sweetener. In another embodiment, the compositions of the disclosure include from about 10% to about 20% by weight of sweetener. In yet another embodiment, the compositions of the disclosure include from about 0.05% to about 10% by weight of sweetener. In yet another embodiment, the compositions of the disclosure include from about 1% to about 4% by weight of sweetener. In yet another embodiment, the compositions of the disclosure include from about 0.05% to about 1% by weight of sweetener.

Preservatives include tocopherols, ascorbic acid, butylated hydroxyanisole (BHA), butylated hydroxytoluene (BHT), and the like. In an embodiment, the compositions of the disclosure include from about 0 ppm to about 50 ppm of preservatives.

Examples of colorants include caramel coloring, FD&C colorings such as blue no. 1, blue no. 2, green no. 3, red no. 3, red no. 40, yellow no. 5, and yellow no. 6, and natural colors such as beta-carotenes, anthrocyanins, annatto, chlorophyllin, cochineal, betanin, curcuminoids, and carotenoids. In an embodiment, the compositions of the disclosure include from about 0.01% to about 5% by weight of colorants. In another embodiment, the compositions of the disclosure include from about 0% to about 2% by weight of colorants. In another embodiment, the compositions of the disclosure include from about 0.01% to about 2% by weight of colorants. In another embodiment, the compositions of the disclosure include from about 0.01% to about 1% by weight of colorants. In yet another embodiment, the compositions of the disclosure include from about 0.01% to about 0.1% by weight of colorants.

Examples of thickeners include guar gum, starch, xanthan gum, carboxymethylcellulose, gum acacia, and defatted flaxseed meal. In an embodiment, the compositions of the disclosure include from about 0.05% to about 2% by weight of thickener.

The compositions of the disclosure can be supplemented or fortified with vitamins and minerals. Examples of vitamins include vitamin A, vitamin $B_5$, vitamin $B_6$, vitamin $B_{12}$, vitamin C, biotin, folate, niacin, riboflavin, thiamine, and tocopherols. In an embodiment, the compositions of the disclosure include from about 0.05% to about 1% by weight of supplemental vitamins. In another embodiment, the compositions of the disclosure include from about 0.1% to about 1% by weight of supplemental vitamins. Examples of minerals include calcium and iron. In an embodiment, the compositions of the disclosure include from about 0.05% to about 1% by weight of supplemental minerals. In another embodiment, the compositions of the disclosure include from about 0.1% to about 1% by weight of supplemental minerals.

The compositions of the disclosure can include natural and/or artificial flavoring agents. Examples of natural flavoring agents include salt, vanilla, spices such as cinnamon, allspice, cloves, ginger, cassia, coca, chocolate, maple syrup, and dried fruit powders, or any other natural flavor as defined by the Code of Federal Regulations Title 21, Chapter I, Subchapter B, Section 101.22. Examples of artificial flavoring agents include maple flavor, butterscotch, vanilla, chocolate, or any other artificial flavor as defined by the Code of Federal Regulations Title 21, Chapter I, Subchapter B, Section 101.22. In an embodiment, the compositions of the disclosure include from about 0.05% to about 6% by weight of flavoring agent. In another embodiment, the compositions of the disclosure include from about 0.05% to about 3% by weight of flavoring agent. In yet another embodiment, the compositions of the disclosure include from about 0.1% to about 2% by weight of flavoring agent. In an embodiment, the compositions of the disclosure include from about 0.05% to about 2% by weight of salt.

The compositions of the disclosure can also be formulated to contain inclusions that provide additional flavoring or texture or nutrients. Examples of inclusions include dehydrated fruit, chocolate chips, coconut, nuts, confectionary pieces, soy protein granules, dehydrated vegetables, marbits, and granola pieces. Examples of dehydrated fruit include apples, raisins, peaches, blueberries, cranberries, pineapple, strawberries, figs, prunes, dates, and the like. Examples of nuts include walnuts, pecans, almonds, peanuts, cashews, and the like. In an embodiment, compositions of the disclosure include from about 1% to about 30% by weight of inclusions. In another embodiment, compositions of the disclosure include from about 1% to about 20% by weight of inclusions. In yet another embodiment, compositions of the disclosure include from about 1% to about 10% by weight of inclusions.

Embodiments of hot cereal compositions of the disclosure are shown in Tables 1 and 2.

TABLE 1

| Ingredient | Formulation A (wt %) | Formulation B (wt %) | Formulation C (wt %) |
|---|---|---|---|
| Wheat farina | 85-99.5 | 55-90 | 55-85 |
| Stearyl antifoam agent | 0.05-1 | 0.05-1 | 0.05-1 |
| Sweetener | 1-4 | 15-30 | 0-30 |
| Supplemental vitamins | 0.1-1 | 0.1-1 | 0.1-1 |
| Supplemental minerals | 0.1-1 | 0.1-1 | 0.1-1 |
| Flavoring agent | — | 0.1-2 | 0.05-6 |
| Fiber additive | — | 0-30 | 0-30 |
| Colorant | — | 0-2 | 0-2 |
| Thickener | — | 0-5 | 0.5 |
| Preservatives | 0-50 ppm | 0-50 ppm | 0-50 ppm |
| Inclusions | — | — | 1-30 |

TABLE 2

| Ingredient | Formulation A (wt %) | Formulation B (wt %) | Formulation C (wt %) |
|---|---|---|---|
| Oats | 55-99.5 | 55-95 | 55-95 |
| Stearyl antifoam agent | 0.05-1 | 0.05-1 | 0.05-1 |
| Sweetener | 1-4 | 15-30 | 0-30 |
| Supplemental vitamins | 0.1-1 | 0.1-1 | 0.1-1 |
| Supplemental minerals | 0.1-1 | 0.1-1 | 0.1-1 |
| Flavoring agent | — | 0.1-2 | 0.05-6 |
| Fiber additive | — | 0-30 | 0-30 |
| Colorant | — | 0-2 | 0-2 |
| Thickener | — | 0-5 | 0.5 |
| Preservatives | 0-50 ppm | 0-50 ppm | 0-50 ppm |
| Inclusions | — | — | 1-30 |

The grain-based hot cereal compositions of the disclosure can be packaged in bulk or in single serving packages, such as a pouch or paperboard or plastic single serving container. A single serving typically contains between about 30 to about 55 grams of the hot cereal composition. The compositions of the disclosure are typically cooked by boiling the composition in an amount of water, milk, or mixture thereof using a stove top or microwave. For microwave cooking using about a 1000 W to 1250 W microwave, a single serving of the hot grain cereal composition of the disclosure is typically mixed with about ½ cup to about 1 cup of water, milk, or a mixture thereof in a single serving (2 cup) cooking vessel, such as a microwaveable bowl, and then cooked in the microwave on the HIGH setting for 1-5 min, preferably 1-3 min.

For stove stop cooking, a single serving of hot grain cereal composition of the disclosure is typically prepared by bringing about ½ cup to about 1 cup of water, milk, or mixture thereof to boil in a cooking vessel having a volume of 2 cups of greater, stirring the composition into the boiling water and/or milk, and then cooking the mixture over medium heat for about 1 minute to about 5 minutes or until thickened. Stopping and stirring the hot cereal compositions of the disclosure during microwave cooking is generally not necessary as the stearyl antifoam agent inhibits foam formation thereby preventing boil over during the microwave cooking process. Similarly, stirring the hot cereal compositions of the disclosure during the stove top cooking process is generally not necessary as the stearyl antifoam agent inhibits foam formation thereby preventing boil over during the stove top cooking process.

In an embodiment, the stearyl antifoam agent reduces foam formation during cooking of the hot grain cereal composition by at least about 50%. In another embodiment, the stearyl antifoam agent reduces foam formation during cooking of the hot grain cereal composition by at least about 60%. In yet another embodiment, the stearyl antifoam agent reduces foam formation during cooking of the hot grain cereal composition by at least about 70%.

Another aspect of the disclosure is a method of reducing the foam capacity of grain-based cereal compositions as described herein. The method comprises adding to a grain-based hot cereal composition prior to cooking about 0.5 micrograms to about 30 micrograms of a stearyl antifoam agent as described herein per gram of the composition. In an embodiment, the method comprises adding to a grain-based hot cereal composition from about 0.5 micrograms to about 10 micrograms of stearyl antifoam agent per gram of the composition. In another embodiment, the method comprises adding to a grain-based hot cereal composition from about 1 microgram to about 5 micrograms of stearyl antifoam agent per gram of composition. In yet another embodiment, the method comprises adding to a grain-based hot cereal composition from about 1 microgram to about 3 micrograms of stearyl antifoam agent per gram of the composition.

Adding a stearyl antifoam agent as described herein to a grain-based hot cereal composition at a concentration of about 0.5 micrograms to about 30 micrograms of stearyl antifoam agent per gram of the composition reduces the foam capacity of the hot cereal composition by at least about 50%. In an embodiment, the stearyl antifoam composition reduces foam capacity of the grain-based hot cereal composition by at least about 60%. In another embodiment, the stearyl antifoam composition reduces foam capacity of the grain-based hot cereal composition by at least about 70%.

EXAMPLES

The following examples are illustrative, and other embodiments exist and are within the scope of the present invention.

Example 1

A standard procedure was developed for measuring the foam capacity of a hot wheat farina cereal. The foam capacity of the hot cereal was determined and candidate antifoam agents were tested for inhibition of foam formation.

Methods

Fourteen grams of original MALT-O-MEAL™ hot wheat cereal was placed in a 1 L plastic beaker with 86 g water, for a total of 100 g water and cereal in the beaker. The ratio of water to cereal was identical to the ratio listed on the cooking instructions (1 cup water per 35 g cereal) for original MALT-O-MEAL™ hot wheat cereal. The foaming capacity of the sample was measured in units of volume. The cereal was cooked in a 1250 W microwave for 3 minutes. At the completion of the 3 minute cook time, the microwave was immediately opened and the foam level was observed and recorded in units of milliliters (ml).

To determine the class of molecule responsible for foam formation, enzymes were added one at a time to the hot wheat cereal and water in the 1 L beaker. These enzymes included xylanase, an enzyme that breaks bonds in non-starch polysaccharides; amylase, an enzyme that breaks glycosidic linkages in starch molecules; and pepsin, an enzyme that breaks peptide bonds in proteins.

Once the identity of the foam was determined, candidate compounds were tested for anti-foam activity and the amount of foam produced by the treated cereal was determined using the standard method described above.

Results

Effective anti-foaming agents decrease the surface tension of the colloid, diffuse to the bubble wall, and disrupt the amphiphillic bilayer by displacing the amphiphillic molecules thereby breaking the foam (FIG. 1). Anti-foaming agents, such as oils, emulsifiers, silicone oils, and fatty acids and their derivatives are commonly used in food products to control foaming. However, previous attempts using additives such as papain, plant oils, soy lecithin, and mono- and di-glycerides have been unsuccessful at reducing foaming of wheat farina hot cereals.

Figure 2:
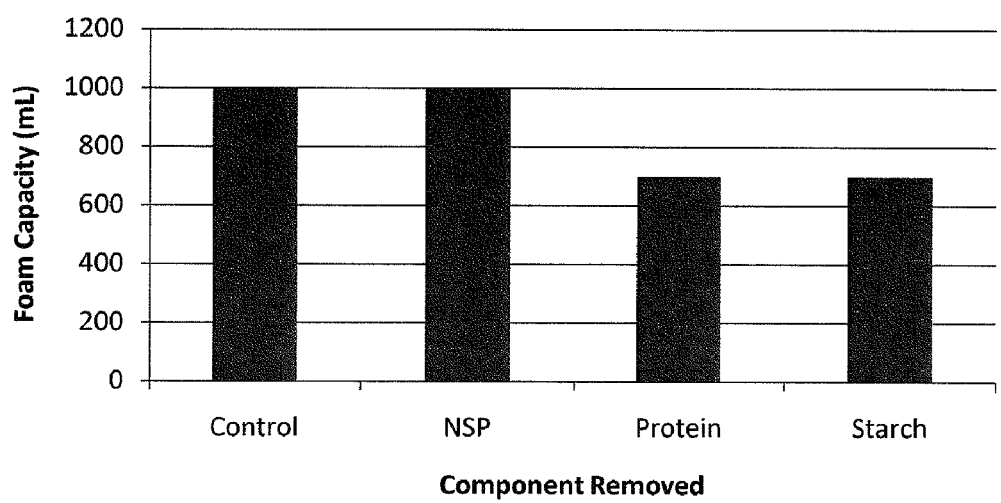
FIG. 2 is a bar graph showing the foam capacity of a hot wheat farina cereal treated with xylanase, amylase, or pepsin

Foam capacity of the wheat farina hot cereal with and without xylanase, amylase, and pepsin is shown in FIG. 2. While treatment of the wheat farina hot cereal with xylanase had no impact on foam capacity, both pepsin and amylase treatment reduced the foam capacity from 1000 ml to 700 ml indicating that the foaming agents in the hot cereal were a combination of starches and proteins intrinsic to the farina.

Figure 3:
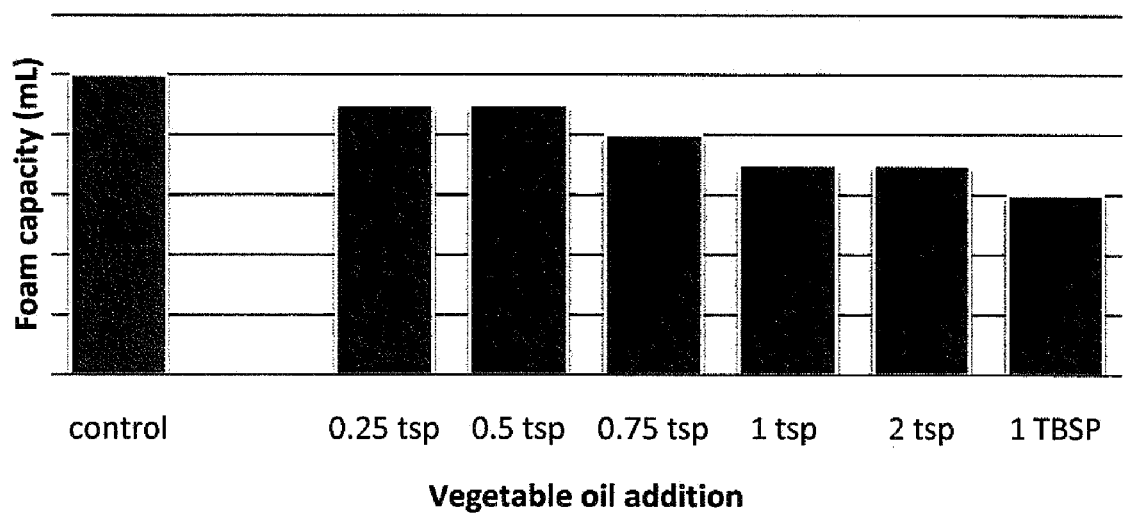
FIG. 3 is a bar graph showing the effect of various amounts of vegetable oil on foam capacity of a hot wheat farina cereal.

Candidate anti-foaming agents were then tested for anti-foam activity in the wheat farina hot cereal using the standard method described above. The candidate agents included vegetable oil, powdered shortening, soy lecithin, calcium silicate, poly-dimethyl siloxane (PDMS), and stearic acid, a long chain saturated fatty acid commonly used as a lubricant and release agent in soaps, cosmetics, deodorants and pharmaceuticals and as a softener in rubber. Vegetable oil was added to the wheat farina hot cereal at various levels from 0.25 tsp to 1 tbsp. As shown in FIG. 3, vegetable oil was capable of reducing the amount of foam formation by about 40%. However, the amount of vegetable oil required to obtain a substantial reduction in foam formation adversely affected the taste and texture of the finished hot cereal product. Soy lecithin was not observed to have an impact on foam formation at levels as high as 3% by weight. Powdered shortening was also observed not to have an impact on foam formation. At 5% by weight of the wheat farina hot cereal, PDMS reduced formation of foam by as much as 50% but adversely affected the taste and texture of the finished product. At 10% by weight of the wheat farina hot cereal, calcium silicate reduced formation of foam by as much as 60% but adversely affected the taste and texture of the finished product.

Figure 4:
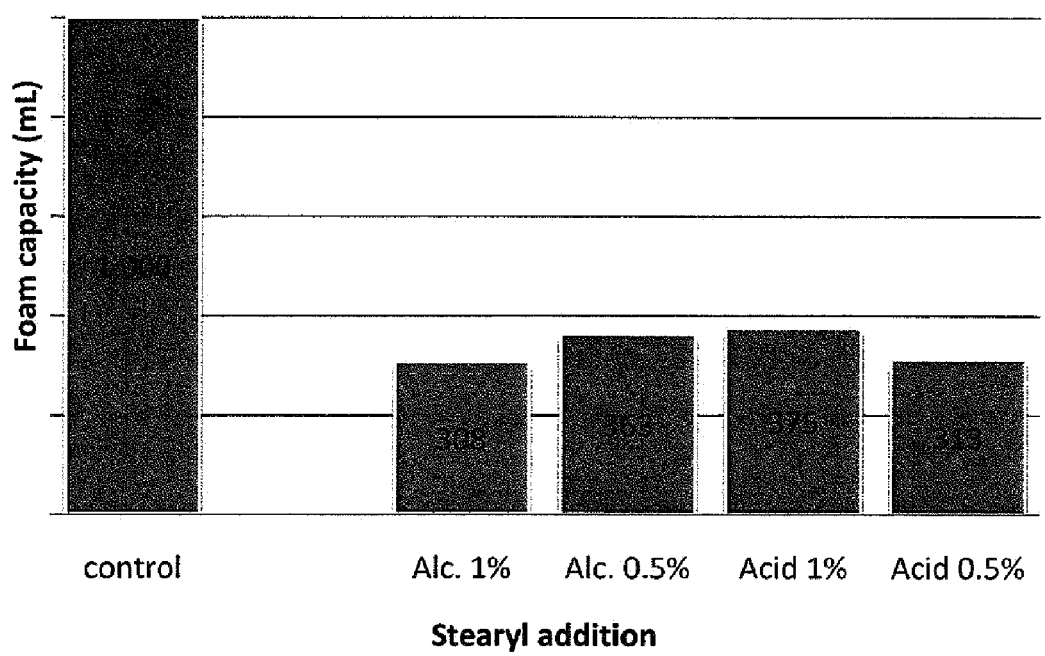
FIG. 4 is a bar graph showing the effect of stearyl acid and stearyl alcohol on foam capacity of a hot wheat farina cereal.

Surprisingly, stearic acid was found to reduce foam formation of wheat farina hot cereal by as much as 70% without adversely affecting the taste and texture of the finished product. As shown in FIG. 4, 1% and 0.5% stearic acid by weight reduced foaming of the wheat farina hot cereal by approximately 62% and approximately 69%, respectively. Other compounds containing a stearyl group were tested and found to exhibit similar antifoam activity without adversely affecting the taste and texture of the finished hot cereal product. As shown in FIG. 4, 1% and 0.5% stearic alcohol by weight reduced foaming of the wheat farina hot cereal by approximately 69% and approximately 64%, respectively. Stearyl alcohol and stearic acid were observed to be as much as 50% more effective in reducing foam formation than magnesium stearate. These results indicate that stearyl compounds are effective anti-foam agents for wheat farina hot cereal and are capable of substantially reducing foam formation without adversely affecting the taste and texture of the finished product.

Example 2

A single serving pouch of wheat farina hot cereal conveys a message to the consumer that the product is "instant". Such hot cereal products are generally perceived by consumers as being an "instant" product if it has a cook time less than 5 minutes, preferably 1-3 minutes, and does not require stirring during the microwave cooking process. To determine if stearyl compounds were suitable for providing an "instant" wheat farina hot cereal product that performs consistent with consumer expectations and perceptions of an "instant" product, stearyl acid, stearyl alcohol, or magnesium stearate were added to the suggested serving size (35 g) of original MALT-O-MEAL™ hot wheat cereal and 1 cup of water in a 2 cup bowl at a concentration of 0.1, 0.25, 0.5, or 1.0 percent by weight. The mixtures were then heated for 2-3 in a 1250 W microwave without stiffing. While the mixtures still came to a boil during the microwave heating and formed some foam, the mixtures did not boil over during the microwave process.

The stearyl compounds were added at similar concentrations to the manufacturer's suggested single serving size of rolled oats, steel-cut oats, or flavored hot wheat farina cereal and 1 cup of water in a 2 cup bowl. The hot cereal mixtures were then heated for 2-3 in a 1250 W microwave without stiffing. Similar to the results observed for original MALT-O-MEAL™ hot wheat cereal, the rolled heats, steel-cut oats, and flavored hot wheat cereals did not boil over during the microwave heating process indicating that the stearyl compounds are also effective anti-foam agents for these products. Similar to the results observed for original MALT-O-MEAL™ hot wheat cereal, the stearyl compounds were capable of substantially reducing foam formation during microwave cooking of the rolled-oats, steel-cut oats, and flavored hot wheat cereals without adversely affecting the taste and texture of the finished product.

While certain embodiments of the invention have been described, other embodiments may exist. While the specification includes a detailed description, the invention's scope is indicated by the following claims. Furthermore, while the specification has been described in language specific to structural features and/or methodological acts, the claims are not limited to the features or acts described above. Rather, the specific features and acts described above are disclosed as illustrative aspects and embodiments of the invention. Various other aspects, embodiments, modifications, and equivalents thereof which, after reading the description herein, may suggest themselves to one of ordinary skill in the art without departing from the spirit of the present invention or the scope of the claimed subject matter.

What is claimed is:

1. A grain-based hot cereal composition, comprising:
   about 55% to about 99.5% grain by weight, wherein the grain is selected from the group consisting of wheat farina, oat groats, rolled oats, steel cut oats and mixtures thereof; and
   an amount of about 0.3 to about 1.5% by weight of an antifoam agent consisting of stearate, stearic acid, stearyl alcohol, stearyl ester, or a mixture thereof, wherein the amount of the antifoam agent is adjusted to reduce a foam capacity of the cereal composition by at least about 50% upon boiling in an aqueous mixture comprising about 2 to 8 parts of aqueous liquid for every 1 part of the cereal composition.

2. The composition of claim 1, wherein the stearyl antifoam agent includes stearyl acid.

3. The composition of claim 1, wherein the stearyl antifoam agent includes stearyl alcohol.

4. The composition of claim 1, wherein the stearate is a metallic stearate.

5. The composition of claim 4, wherein the metallic stearate is magnesium stearate.

6. The composition of claim 1, wherein the stearyl antifoam agent is a monoglyceride.

7. The composition of claim 6, wherein the monoglyceride is glyceryl monostearate.

8. The composition of claim 1, further comprising a fiber additive, sweetener, preservative, supplemental vitamins, supplemental minerals, thickener, flavoring agents, or colorant.

9. The composition of claim 8, comprising about 0% to about 30% fiber additive by weight.

10. The composition of claim 8, comprising about 0% to about 30% sweetener by weight.

11. The composition of claim 8, comprising about 0 ppm to about 50 ppm of preservative.

12. The composition of claim 8, comprising about 0.05% to about 1% supplemental vitamins by weight.

13. The composition of claim 8, comprising about 0.05% to about 1% supplemental minerals by weight.

14. The composition of claim 8, comprising about 0.05% to about 2% thickener by weight.

15. The composition of claim 8, comprising about 0.05% to about 6% flavoring agent by weight.

16. The composition of claim 8, comprising about 0.01% to about 5% colorant by weight.

17. The composition of claim 1, further comprising an inclusion comprising dehydrated fruit, chocolate chips, or nuts.

18. The composition of claim 17, comprising about 1% to about 30% inclusion by weight.

19. The composition of claim 1, wherein the stearyl antifoam agent comprises a particulate having a particle size within at least 70% the average particle size of the grain.

20. The composition of claim 1, wherein the stearyl antifoam agent comprises particles of stearic acid.

21. A single serving pouch of a hot grain cereal composition according to claim 1, the pouch comprising about 30 grams to about 55 grams of said composition.

22. A single serving pouch of a hot grain cereal composition according to claim 1, the composition comprising wheat farina, oat groats, rolled oats, or steel cut oats.

23. A method of reducing foam capacity of a grain-based hot cereal composition, comprising adding to the composition prior to cooking about 0.5 micrograms to about 10 micrograms of a stearyl antifoam agent per gram of the composition, wherein the stearyl antifoam agent consists of stearate, stearic acid, stearyl alcohol, stearyl ester, or a mixture thereof, and wherein the amount of the antifoam agent is adjusted to reduce a foam capacity of the cereal composition by at least about 50% upon boiling in an aqueous mixture, and the cereal composition comprises a grain selected from the group consisting of wheat farina, oat groats, rolled oats, steel cut oats, and mixtures thereof.

24. The method of claim 23, wherein the stearyl antifoam agent includes stearyl acid.

25. The method of claim 23, wherein the stearyl antifoam agent includes stearyl alcohol.

26. The method of claim 23, wherein the stearate is a metallic stearate.

27. The method of claim 26, wherein the metallic stearate is magnesium stearate.

28. The method of claim 23, wherein the stearyl antifoam agent is a monoglyceride.

29. The method of claim 28, wherein the monoglyceride is glyceryl monostearate.

30. The method of claim 23, the composition further comprising a fiber additive, sweetener, preservative, supplemental vitamins, supplemental minerals, thickener, flavoring agents, or colorant.

31. The method of claim 30, the composition comprising about 0% to about 30% fiber additive by weight.

32. The method of claim 30, the composition comprising about 0% to about 30% sweetener by weight.

33. The method of claim 30, the composition comprising about 0 ppm to about 50 ppm of preservative.

34. The method of claim 30, the composition comprising about 0.05% to about 1% supplemental vitamins by weight.

35. The method of claim 30, the composition comprising about 0.05% to about 1% supplemental minerals by weight.

36. The method of claim 30, the composition comprising about 0.05% to about 2% thickener by weight.

37. The method of claim 30, the composition comprising about 0.05% to about 6% flavoring agent by weight.

38. The method of claim 30, the composition comprising about 0.01% to about 5% colorant by weight.

39. The method of claim 23, the composition further comprising an inclusion comprising dehydrated fruit, chocolate chips, or nuts.

40. The method of claim 39, the composition comprising about 1% to about 30% inclusion by weight.

41. The method of claim 23, wherein the stearyl antifoam agent comprises a particulate having a particle size within at least 70% the average particle size of the grain.

42. The method of claim 23, wherein the stearyl antifoam agent comprises particles of stearic acid.

43. The composition of claim 1, wherein the grain consists of wheat farina.

* * * * *

UNITED STATES PATENT AND TRADEMARK OFFICE
CERTIFICATE OF CORRECTION

| | | |
|---|---|---|
| PATENT NO. | : 9,131,715 B2 | Page 1 of 1 |
| APPLICATION NO. | : 13/791169 | |
| DATED | : September 15, 2015 | |
| INVENTOR(S) | : David Klaus Duffy and Molly Elizabeth McGurk Moen | |

It is certified that error appears in the above-identified patent and that said Letters Patent is hereby corrected as shown below:

On the title page delete item (73) Assignee "Ecolab USA Inc., Saint Paul, MN"

Signed and Sealed this
Sixteenth Day of February, 2016

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 9,131,715 B2 | Page 1 of 1 |
| APPLICATION NO. | : 13/791169 | |
| DATED | : September 15, 2015 | |
| INVENTOR(S) | : David Klaus Duffy et al. | |

It is certified that error appears in the above-identified patent and that said Letters Patent is hereby corrected as shown below:

"On the title page delete item (73) Assignee "Ecolab USA Inc., Saint Paul, MN""

(as corrected to read in the Certificate of Correction issued February 16, 2016) is deleted and patent is returned to its original state with the applicant & assignee name in patent to read --Ecolab USA Inc., Saint Paul, MN (US)--

Signed and Sealed this
Thirty-first Day of May, 2016

Michelle K. Lee
*Director of the United States Patent and Trademark Office*